J. O. DREWS.
FIBER EXTRACTING APPARATUS.
APPLICATION FILED JUNE 25, 1909.
998,331.
Patented July 18, 1911.
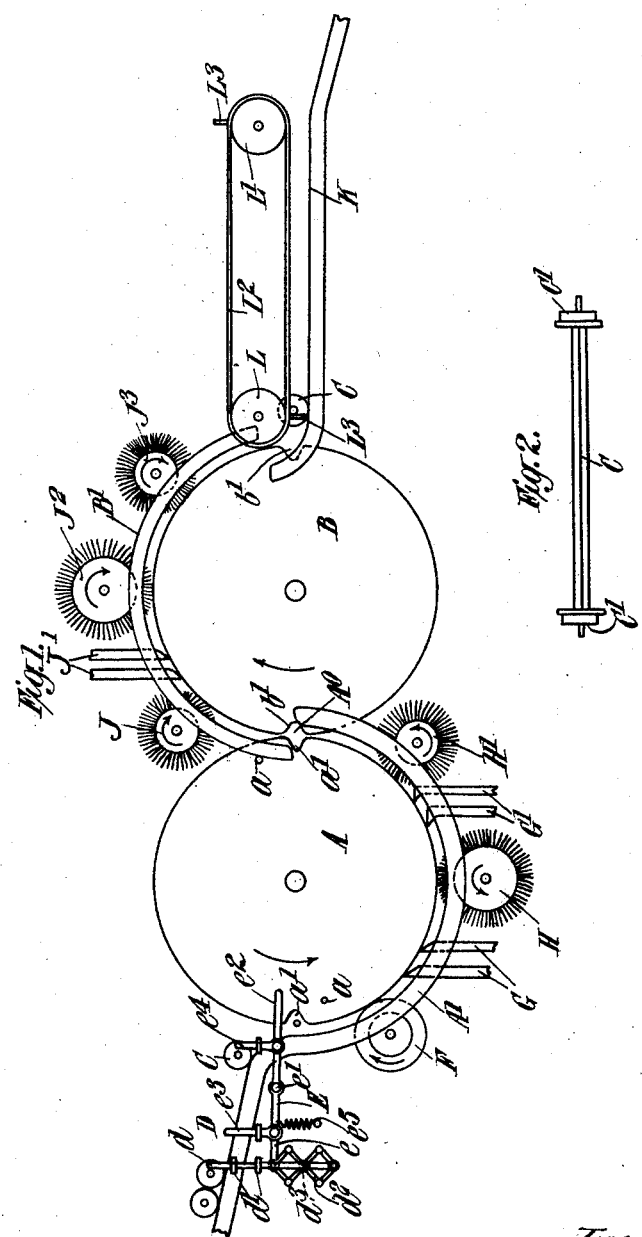
Witnesses:
Inventor
Julius O. Drews
By
James L. Norris.
Atty.

United States Patent Office.

JULIUS OSCAR DREWS, OF LONDON, ENGLAND.

FIBER-EXTRACTING APPARATUS.

998,331.  Specification of Letters Patent.  Patented July 18, 1911.

Application filed June 25, 1909. Serial No. 504,325.

*To all whom it may concern:*

Be it known that I, JULIUS OSCAR DREWS, a subject of the King of Great Britain, residing at 16 Caroline street, in the borough of Holborn, in the county of London, England, have invented certain new and useful Improvements Relating to Fiber-Extracting Apparatus, of which the following is a specification.

This invention relates to the treatment of vegetable matter such as the leaves and stems of banana or aloe plants and has reference to apparatus of the kind in which the material to be treated is clamped in carriers and is caused to travel on the surface of revolving drums into close proximity to cutting or scraping devices which remove the fleshy portions from one side of the leaves after which the other side of each leaf is automatically caused to become exposed to a similar scraping treatment.

The chief object of the present invention is to provide improved apparatus of this kind, whereby fiber can be efficiently extracted for use in making rope and for other purposes.

According to this invention the carriers in which the leaves or the like are clamped are held in position against the surface of the revolving drums or cylinders by guide rails conforming to the contour of the drums or cylinders and adapted to engage with the carriers. The guide rails are so arranged that after one drum or cylinder has conveyed a carrier and its attached leaves past suitable cutting or scraping devices, located adjacent to the surface of the said drum or cylinder on which the leaves are wrapped, the rails guide the said carrier away from one drum or cylinder into contact with a similar adjacent drum or cylinder against which the carrier is similarly retained by the rails while the opposite sides of the leaves are subjected to a similar cutting or scraping action. The carriers are fed forward toward the first drum or cylinder by a feed regulating device which is such that any desired number of carriers may be loaded with leaves and passed toward the feed regulating device which temporarily retains them and automatically feeds them to the first drum or cylinder at the correct intervals one at a time.

In order that the said invention may be clearly understood and readily carried into effect, I will proceed to describe the same more fully with reference to the accompanying drawings in which:—

Figure 1 is an end elevation of apparatus constructed in accordance with this invention; Fig. 2 being a plan of one of the carriers.

A and B are two drums or cylinders and A′, B′ the guide rails coöperating therewith; C represents the carriers, and D the feed regulating device. The stalks of say, banana leaves, are firmly clamped to the carriers for which purpose the carriers may be constructed in two semi-cylindrical portions, so as to form a cylindrical rod when fastened together with the stalks between them.

The extremities of the carriers are provided with rollers C′ adapted to engage with the pairs of guide rails A′, B′ which are placed adjacent to the ends of the cylinders A, B on each side of the framework of the apparatus. The leaves having been clamped to the carriers, the latter are placed on the guide rails above the feed regulating device D, toward which they roll and are detained by the finger $d$ thereof. This finger $d$ is mounted in guides $d'$ and is hinged at its lower end to the arrangement of lazy tongs $d^2$ to the upper end of which the end $e$ of the pivoted lever E is hinged. The axis $d^3$ of the lazy tongs is stationary; hence an upward movement of the end $e$ of the lever E causes the finger $d$ to be depressed and vice versa. The aforesaid lever E is pivoted at $e'$ and projects at its free end $e^2$ into the path of the pins or projections $a$ on the cylinder A. The lever E is also provided with two fingers $e^3$ $e^4$, the operation of which is hereinafter described. The two cylinders A and B are formed with pockets $a'$, $b'$ on their surfaces and the cylinder A is provided with the same number of pins $a$ as it has pockets $a'$. In the drawing two pockets diametrically situated on each drum or cylinder and two cylinders are shown, although it will be understood that the number of cylinders and of pockets thereon may be increased if desired. When the pin or projection $a$ on the cylinder A depresses the free end $e^2$ of the lever E, the finger $e^4$ is depressed, thus allowing the carrier that was previously detained by the finger $e^4$ to be released and pass into the adjacent pocket $a'$ on the cylinder A; also the finger $e^3$ is raised, and the finger $d$ depressed thus allowing the remaining carriers to advance up to the finger $e^3$. When the free end $e^2$ of the lever E escapes from the pin $a$ by the continued movement of the latter, the lever E returns to its normal position under the influence of the spring $e^5$; thus the finger $e^4$ rises, the finger $d$ also rises to obstruct the advance of all the carriers except that one which is abutting against the finger $e^3$, and the latter is depressed, thus allowing the carrier that it detained to advance up to the finger $e^4$. The feed regulating device D then remains in this condition until the next pin or projection on the cylinder A engages the free end $e^2$ of the lever E. The moment at which the fingers are actuated is, of course, such that the liberated carrier C on arriving at the revolving drum or cylinder A is received into the recess or pocket $a'$. The carrier thus fed forward is held in the aforesaid recess or pocket $a$ by the engagement of the rollers C' with the guide rails A' which latter conform to the contour of the drum or cylinder. As the carrier advances the leaves are spread or wrapped upon the face of the drum or cylinder by means of a suitably mounted roller F situated adjacent thereto. The leaves while being carried onward are then acted upon by one or more stationary cutters or scrapers G which are placed at the requisite distance from the surface of the drum or cylinder to remove the fleshy part of the leaves on their exterior. They then pass in contact with a device H rotated so that its surface travels in the opposite direction to that of the aforesaid drum A and provided with serrations, teeth or metal bristles. A second set of stationary scrapers G' and a soft metal brush H' complete the removal of the fleshy matter of the leaves on the side exposed to these devices. At the point A° the rollers C' on the carrier encounter the rails B' which transfer the carrier from the pocket $a'$ in the drum A to the pocket $b'$ in the drum B. The opposite sides of the leaves now become exposed to a similar set of scraping devices comprising the hard rotary metal brush J, the stationary scraper J', the fine rotary metal brush $J^2$, and the rotary bristle brush $J^3$. The drum A may be covered with brass, sheet copper or other chemically inert metal and the drum B may be covered with rubber or other suitable elastic material. The carrier, after leaving the rails B', encounters the rails K, which guide said carrier out of the pocket $b'$ to any convenient place.

On each side of the framework of the apparatus I provide a pair of wheels L L' around which an endless traveling band or chain $L^2$ is passed. This band or chain is provided with a series of projecting stops $L^3$ which are spaced so as to come into contact with the carrier or the rollers C' on the ends thereof at the moment when the guide rails K remove said carrier from the revolving drum or cylinder B.

The fibrous remains of the leaves are ultimately removed from the carriers and subjected to any washing, combing, drying or other finishing operation that may be necessary. The drums and other rotating parts of the apparatus may be geared together by toothed, belt or chain gearing as may be most convenient and driven from one or more suitably placed driving pulleys.

What I claim and desire to secure by Letters Patent of the United States is:—

1. Apparatus for treating leaves and other fibrous matter, comprising adjacent drums each angularly movable about its axis, scraping contrivances placed adjacent to the surface of the drums, a leaf carrier, means for causing the drums to carry the leaf carrier with them as they are moved, guide rails conforming to the contour of the drums for retaining the leaf carrier in position on the drums and for transferring it from one drum to the adjacent drum.

2. Apparatus for treating leaves and other fibrous matter, comprising adjacent pocketed drums rotating in opposite directions, scraping contrivances placed adjacent to the surface of the drums, leaf carriers, and guide rails conforming to the contour of the drums for retaining the leaf carriers in the pockets of the drums and for transferring them from the pocket of one drum to a pocket in the adjacent drum.

3. Apparatus for treating leaves and other fibrous matter, comprising adjacent pocketed cylindrical drums rotating in opposite directions, scraping contrivances placed adjacent to the surfaces of the drums, an independent semi-circular guide rail situated at each end of each drum adjacent to its periphery, the ends of the rails of one drum pointing in the opposite direction to the adjacent ends of the rails of the adjacent drum, leaf carriers fitting the pockets on the drums, and rollers on the ends of the leaf carriers for engagement with the guide rails.

4. Apparatus for treating leaves and other fibrous matter, comprising two adjacent cylindrical drums each having two diametrically situated pockets formed longitudinally in their surface, scraping contrivances placed adjacent to the surfaces of the drums, leaf carriers shaped to fit into the aforesaid pockets, means actuated by the first drum for feeding forward the leaf carriers one at a time at the correct intervals, guide rails conforming to the contour of the drums for retaining the leaf carriers in the pockets of the drums and for transferring them from the pocket of one drum to a pocket in the other drum, and means for removing the leaf carriers from the second drum.

5. Apparatus for treating leaves and other fibrous matter, comprising adjacent pocketed cylindrical drums rotating in opposite directions, brushing contrivances placed adjacent to the drums and rotating so that their surfaces travel in the opposite direction to that of the drum surfaces, leaf carriers, and guide rails conforming to the contour of the drums for retaining the leaf carriers in the pockets of the drums and for transferring them from the pocket of one drum to a pocket in the adjacent drum.

6. Apparatus for treating leaves and other fibrous matter, comprising two adjacent cylindrical drums each having two diametrically situated pockets formed longitudinally in their surface, scraping contrivances placed adjacent to the surfaces of the drums, leaf carriers shaped to fit into the aforesaid pockets, means actuated by the first drum for feeding forward the leaf carriers one at a time at the correct intervals, an independent semi-circular guide rail situated at each end of each drum adjacent to its periphery, the ends of the rails of one drum pointing in the opposite direction to the adjacent ends of the rails of the other drum and terminating near the line of contact of the two drums, on which line the pockets on the two drums come into coincidence, and means for removing the leaf carriers from the second drum.

7. In apparatus of the kind herein described, the combination, with the rotary drums and leaf carriers, of means for feeding forward the leaf carriers to the first rotating drum, comprising inclined rails on which the leaf carriers roll toward the drum, means for detaining the carriers as they travel down the rails, and means on the drum for operating the detaining means so as to allow the leaf carriers to pass to the drum one at a time at the correct intervals.

8. In apparatus of the kind herein described, the combination, with the rotary drums and leaf carriers, of means for removing the leaf carriers from the last of the rotating drums, comprising rails directed away from the surface of said last drum and having their ends projecting into the path of the leaf carriers as the latter are being conveyed in the pockets of the drum, an endless band traveling parallel to the aforesaid rails, and projections on the traveling band for engaging with the leaf carriers.

9. In a machine of the class described, the combination with a pair of drums, of a recess formed in each of the drums, each recess having a rear wall, a plurality of clamps adapted to carry the material to be treated, stationary means surrounding each of the drums to hold the clamps in the recesses, means whereby the clamps may be transferred from one drum to the other, and scraping knives so located as to scrape the material during the rotation of the drum.

10. In a machine of the class described, the combination with a drum, a recess extending transversely of the periphery of the drum, a pair of stationary circular plates having their inner edges extending adjacent the periphery of the drum, a plurality of clamps adapted to carry the material to be treated and adapted to be engaged by the recess in the drum at one point in its revolution, and be held in said recess by said stationary plates, and means for removing the clamp from the recess at another point in the rotation of the drum.

In testimony whereof I affix my signature in presence of two witnesses.

JULIUS OSCAR DREWS.

Witnesses:
W. J. NORWOOD,
WALTER I. SKERTEN.

Copies of this patent may be obtained for five cents each, by addressing the "Commissioner of Patents, Washington, D. C."